(12) United States Patent
Kang et al.

(10) Patent No.: US 7,847,476 B2
(45) Date of Patent: Dec. 7, 2010

(54) LIGHT EMISSION DEVICE, METHOD OF MANUFACTURING THE LIGHT EMISSION DEVICE, AND DISPLAY DEVICE HAVING THE LIGHT EMISSION DEVICE

(75) Inventors: Su-Joung Kang, Yongin-si (KR); Sang-Jin Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 662 days.

(21) Appl. No.: 11/739,490

(22) Filed: Apr. 24, 2007

(65) Prior Publication Data
US 2008/0100196 A1    May 1, 2008

(30) Foreign Application Priority Data
Sep. 5, 2006    (KR) .................... 10-2006-0085215

(51) Int. Cl.
  *H01J 1/62* (2006.01)
(52) U.S. Cl. .................... 313/496; 313/495
(58) Field of Classification Search ......... 313/495–497, 313/309–311
  See application file for complete search history.

(56) References Cited

U.S. PATENT DOCUMENTS

2005/0174040 A1*  8/2005  Jung et al. ................ 313/495

FOREIGN PATENT DOCUMENTS

| EP | 0 497 627 B1 | 7/1997 |
| KR | 1992-0017166 | 9/1992 |
| KR | 20-0171364 | 7/1998 |
| KR | 10-2005-0089639 | 9/2005 |
| KR | 10-2006-0029077 | 4/2006 |
| KR | 10-2006-0119271 | 11/2006 |

OTHER PUBLICATIONS

English abstract of Utility Model publication 20-0171364 listed above.
Korean Patent Abstracts, Publication No. 1020050089639 A, dated Sep. 8, 2005, in the name of Seong Hak Moon.
Korean Patent Abstracts, Publication No. 1020060029077 A, dated Apr. 4, 2006, in the name of Il Hwan Kim.
Korean Patent Abstracts, Publication No. 1020060119271 A, dated Nov. 24, 2006, in the name of Sang Jin Lee.

* cited by examiner

*Primary Examiner*—Bumsuk Won
(74) *Attorney, Agent, or Firm*—Christie, Parker & Hale, LLP (57) ABSTRACT

A light emission device, a method of manufacturing the same, and a display device using the same as a backlight unit. In one embodiment, a light emission device includes first and second substrates facing each other, a first electrode arranged on the first substrate in a first direction, a second electrode in a second direction crossing the first direction with an insulation layer interposed between the first and second electrodes, an electron emission region electrically connected to one of the first and second electrodes, and a phosphor layer formed on the second substrate, and an anode electrode formed on the phosphor layer. At least one of the first and second electrodes is divided into a plurality of sub-electrodes, first ends of which are for electrical interconnecting. A driving error electrode among the sub-electrodes is separated from the first ends of other normal electrodes.

17 Claims, 12 Drawing Sheets

LIGHT EMISSION DEVICE, METHOD OF MANUFACTURING THE LIGHT EMISSION DEVICE, AND DISPLAY DEVICE HAVING THE LIGHT EMISSION DEVICE

CROSS-REFERENCE TO RELATED APPLICATION

This application claims priority to and the benefit of Korean Patent Application No. 10-2006-0085215, filed on Sep. 5, 2006, in the Korean Intellectual Property Office, the entire content of which is incorporated herein by reference.

BACKGROUND OF THE INVENTION

1. Field of the Invention

The present invention relates to a light emission device, a method of manufacturing the light emission device, and a display device using the light emission device as a backlight unit. More particularly, the present invention relates to a driving electrode of the light emission device.

2. Discussion of Related Art

A liquid crystal display, which is one of a variety of flat panel display devices, displays an image by varying a light transmission amount at each pixel using a dielectric anisotropy property of liquid crystal whose twisting angle varies according to a voltage applied.

The liquid crystal display includes a liquid crystal panel assembly and a backlight unit for emitting light toward the liquid crystal panel assembly. The liquid crystal panel assembly receives light emitted from the backlight unit and allows the light to be transmitted or blocked by a liquid crystal layer.

Backlight units can be classified according to their light sources into different types (or light source types), one of which is a cold cathode fluorescent lamp (CCFL) type. The CCFL is a linear light source that can uniformly emit light to the liquid crystal panel assembly through optical members such as a diffusion sheet, a diffuser plate, and a prism sheet.

However, in the CCFL type backlight unit, since the light emitted from the CCFL travels through the optical members, there may be a light loss. Considering the light loss, a relatively high intensity of light is emitted from the CCFL. This causes an increase in power consumption. Furthermore, since it is difficult to increase the size of the CCFL type backlight unit due to a structural limitation of the CCFL type backlight unit, the CCFL type backlight unit may not be applied to a large-size liquid crystal display (e.g., a liquid crystal display that is over 30 inches).

A light emission diode (LED) type backlight unit is another light source type that may be used to provide light to a liquid crystal display. The LED type backlight unit includes a plurality of LEDs and optical members such as a reflection sheet, a waveguide plate, a diffusion sheet, a diffuser plate, a prism sheet, and the like. The LED type backlight unit has fast response time and relatively good color reproduction characteristics. However, the LED is costly and increases an overall thickness of the liquid crystal display.

Therefore, recently, a field emission type backlight unit that emits light using an electron emission property of an electric field has been developed to replace the CCFL and LED type backlight units.

Since the field emission type backlight unit should provide a relatively high luminance, a relatively high voltage is applied to an anode electrode of the field emission type backlight unit. As such, there may be a short circuit between the driving electrode formed on a first substrate of the field emission type backlight unit and the anode electrode formed on a second substrate of the field emission type backlight unit. In addition, an arc discharge may be generated in a vacuum envelope (or chamber) of the field emission type backlight unit. The arc discharge may damage the driving electrodes.

Furthermore, among the driving electrodes, cathode and gate electrodes should be insulated from each other. However, the cathode and gate electrodes may be short-circuited during a manufacturing process.

When the driving electrodes are short-circuited or damaged as described above, the pixels controlled by the driving electrodes cannot properly emit light. That is, in a conventional field emission type light emission device (or backlight unit), when one driving electrode is damaged, all of the pixels that are controlled by the damaged driving electrode are defective in the emission of light.

In addition, the conventional backlight units are maintained at a constant (or predetermined) brightness when the liquid crystal display is driven. Therefore, it is difficult to improve the display quality of the liquid crystal display to a sufficient level.

For example, when the liquid crystal panel assembly intends to display an image having a high luminance portion and a low luminance portion in response to an image signal, it will be possible to realize an image having a more improved dynamic contrast if the backlight unit can emit lights having different intensities to the respective high and low luminance portions.

However, since the conventional backlight units may not achieve the above function, the liquid crystal display has a limitation in how much the dynamic contrast of an image can be improved.

SUMMARY OF THE INVENTION

An aspect of an embodiment of the present invention is directed to a light emission device that can protect (or prevent) a driving electrode from being fully defective even when the driving electrode is locally defective by separating (or isolating) the local damaged portion of the driving electrode, and a method of manufacturing the light emission device.

Another aspect of an embodiment of the present invention is directed to a light emission device that can independently control light intensities of a plurality of divided regions of a light emission surface, and a display device that can enhance the dynamic contrast of the image by using the light emission device as a backlight unit.

An embodiment of the present invention provides a light emission device including first and second substrates facing each other to form a vacuum chamber (or envelope); a first electrode arranged on the first substrate in a first direction; a second electrode arranged above the first electrode in a second direction crossing the first direction with an insulation layer interposed between the first and second electrodes; an electron emission region electrically connected to one of the first electrode or the second electrode; a phosphor layer arranged on the second substrate; and an anode electrode arranged on the phosphor layer, wherein at least one of the first electrode or the second electrode is divided into a plurality of sub-electrodes, wherein first ends of the plurality of sub-electrodes are adapted to be electrically interconnected, and wherein the plurality of sub-electrodes are adapted to be selectively separable such that a driving error sub-electrode of the plurality of sub-electrodes is electrically separable from the first ends of normally driving sub-electrodes of the plurality of sub-electrodes.

A crossed region of the first and second electrodes may define a unit pixel.

In one embodiment, the driving error sub-electrode is electrically separated from the first ends of the normally driving sub-electrodes.

The light emission device may further include a ground electrode formed in the vacuum chamber, wherein the separated driving error sub-electrode is electrically connected to the ground electrode.

Each of the sub-electrodes may have a width within a range from about 0.1 to about 5 mm.

The number of the sub-electrodes of the first electrode may be the same as that of the sub-electrodes of the second electrode.

The electron emission regions may be formed of a carbon-based material, a nanometer-sized material, or combinations thereof.

Another embodiment of the present invention provides a method of manufacturing a light emission device including a first electrode formed on a first substrate, an electron emission region electrically connected to the first electrode, and a second electrode formed above the first electrode with an insulation layer interposed between the first and second electrodes, the insulation layer and the second electrode being provided with openings for exposing the electron emission region, the method including: dividing at least one of the first electrode or the second electrode into a plurality of sub-electrodes, first ends of the plurality of sub-electrodes being electrically interconnected; detecting a defective sub-electrode of the plurality of sub-electrodes by applying a voltage to the first and second electrodes; and separating electrically the defective sub-electrode from the first ends of normally driving sub-electrodes of the plurality of sub-electrodes.

The separating of the defective sub-electrode may be performed using an over-current.

The method may further include a ground electrode on an edge (or edge portion) of the first substrate and electrically connecting the ground electrode to the electrically separated defective sub-electrode.

Another embodiment of the present invention provides a display device including: a light emission device according to above described embodiments of the present invention; and a panel assembly configured with (or in front of) the light emission device to display an image by receiving light emitted from the light emission device.

The panel assembly may include a plurality of first pixels and the light emission devices includes a plurality of second pixels, the number of second pixels are less than that of the first pixels, and the second pixels allow for emitting different intensities of light at the second pixels.

The number of first pixels arranged in each row of the panel assembly may be more than 240, and the number of first pixels arranged in each column of the liquid crystal panel assembly may be more than 240.

The number of second pixels arranged in each row of the light emission device may be within a range from 2 to 99, and the number of second pixels arranged in each column of the light emission device may be within a range from 2 to 99.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Also, in the context of the present application, when an element is referred to as being "on" another element, it can be directly on the another element or be indirectly on the another element with one or more intervening elements interposed therebetween.

FIGS. 1 through 4 show a light emission device according to an exemplary embodiment of the present invention.

Figure 1:
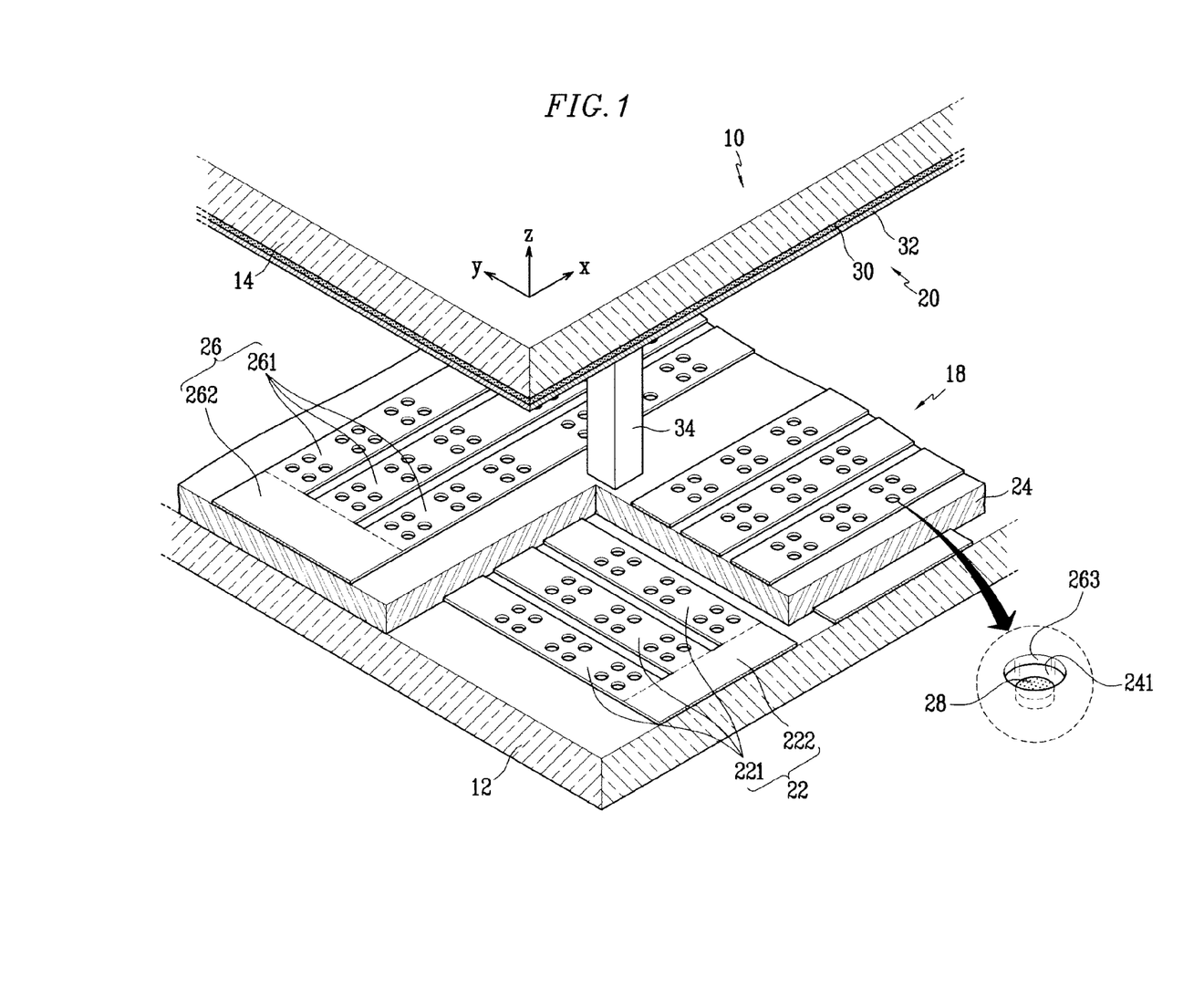
FIG. 1 is a partial exploded perspective view of a light emission device according to an exemplary embodiment of the present invention.

Referring to FIG. 1, a light emission device 10 includes first and second substrates 12 and 14 facing each other in parallel with an interval (or distance) therebetween (wherein the distance therebetween may be predetermined). A sealing member is provided at the peripheries (or periphery regions) of the first and second substrates 12 and 14 to seal the first and second substrates 12 and 14 together and to thus form a vacuum envelope (or vacuum chamber). The interior of the vacuum envelope is kept (and exhausted) to a degree of vacuum of about $10^{-6}$ Torr.

Each of the first and second substrates 12 and 14 has an effective region for emitting visible light (within a region surrounded by the sealing member and the first and second substrates 12 and 14) and an ineffective region surrounding the effective region. An electron emission unit 18 for emitting electrons is provided on the first substrate 12 at the effective region and a light emission unit 20 for emitting the visible light is provided on the second substrate 14 at the effective region.

The electron emission unit 18 includes first electrodes 22 arranged in a stripe pattern along a first direction of the first substrate 12, second electrodes 26 arranged in a stripe pattern along a second direction crossing the first direction of the first electrodes 22, an insulation layer 24 interposed between the first electrodes 22 and the second electrodes 26, and electron emission regions 28 electrically connected to the first electrodes 22 or the second electrodes 26.

When the electron emission regions 28 are formed on the first electrodes 22, the first electrodes 22 function as cathode electrodes for applying a current to the electron emission regions 28 and the second electrodes 26 function as gate electrodes for inducing the electron emission by forming the electric field around the electron emission regions 28 according to a voltage difference between the cathode and gate electrodes. By contrast, when the electron emission regions 28 are formed on the second electrodes 26, the second electrodes 26 function as the cathode electrodes and the first electrodes 22 function as the gate electrodes.

In one embodiment, among the first and second electrodes 22 and 26, the electrodes arranged in (or extending along) a row direction (the x-axis of FIG. 1) of the light emission device 10 function as scan electrodes, and the electrodes arranged in (or extending along) a column direction (the y-axis of FIG. 1) of the light emission device 10 function as a data electrode.

In the present embodiment, the electron emission regions 28 are formed on the first electrodes 22, the first electrodes 22 are arranged in the column direction of the light emission device 10, and the second electrodes 26 are arranged in the row direction of the light emission device 10. However, the present invention is not limited to this embodiment. That is, the electron emission regions 28, and the first and second electrodes 22 and 26 may be arranged in a variety of suitable patterns.

In the present embodiment, each of the first electrodes 22 includes a plurality of divided sub-electrodes 221 extending along a length of the first electrodes 22 and a first connecting portion 222 connecting first ends of the first sub-electrodes 221. Likewise, each of the second electrodes 26 includes a plurality of divided sub-electrodes 261 extending along a length of the second electrodes 26 and a second connecting portion 262 connecting first ends of the second sub-electrodes 261. In FIG. 1, a boundary between the sub-electrodes and their connecting portion is shown by a dotted line.

That is, each of the first electrodes 22 is divided (or separated) into a plurality of strips and each of the second electrodes 26 is also divided into a plurality of strips. The divided strips of each of the sub-electrodes 221, 261 are electrically connected to their connecting portion 222, 262 to receive an identical (or substantially identical) voltage.

By dividing (or separating or segregating) each of the first and second electrodes 22, 26 into the plurality of sub-electrodes 221, 261, when one of the sub-electrodes 221, 261 is defective due to, for example, a short-circuit, only the defective sub-electrode 221, 261 may be (or is or needs to be) separated (or isolated) from the connecting portion 222, 262. Therefore, even when the electrode 22, 26 is locally damaged, the electrode 22, 26 is not fully deprived of its function.

The number of sub-electrodes 221, 261 of each electrode 22, 26 may be determined by considering a line resistance. The number of the first sub-electrodes 221 of each first electrode 22 may be the same as or different from that of the second sub-electrodes 261 of each second electrode 26.

Figure 2:
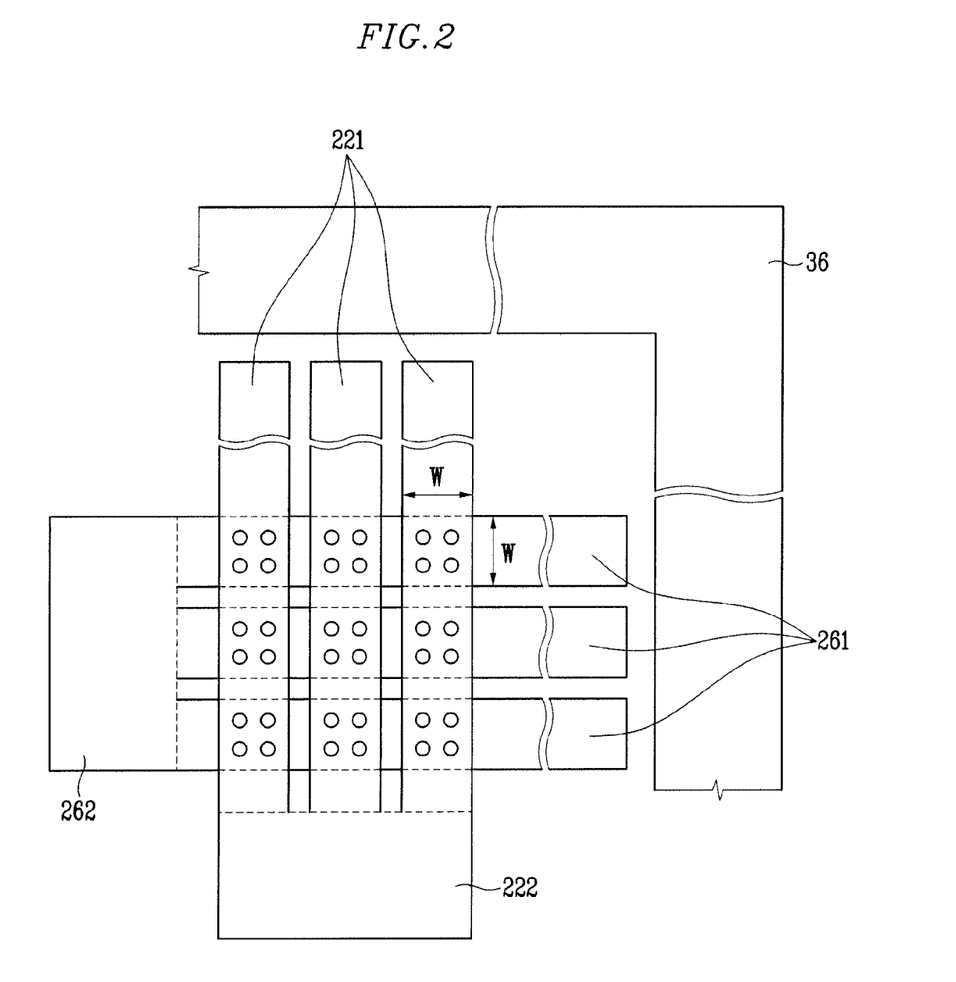
FIG. 2 is a partial top view of first and second electrodes and a ground electrode of the light emission device of FIG. 1.

Each of the first and second sub-electrodes 221 and 261 has a width W within a range from 0.1 to 5 mm, and, in one embodiment, the width W is 1 mm (see FIG. 2).

Openings 263 and 241 are formed in the second electrodes 26 and the insulation layer 24 at each crossed region of the first and second electrodes 22 and 26 to partly (or partially) expose the surface of the first electrodes 22, and the electron emission regions 28 are formed on the exposed portions of the first electrodes 22 through the openings 241 of the insulation layer 24 and/or the openings 263 of the second electrodes 26.

The electron emission regions 28 are formed of a material for emitting electrons when an electric field is applied thereto under a vacuum atmosphere, such as a carbon-based material or a nanometer-sized material.

For example, the electron emission regions 28 can be formed of carbon nanotubes, graphite, graphite nanofibers, diamonds, diamond-like carbon, $C_{60}$, silicon nanowires or combinations thereof. The electron emission regions 28 can be formed through a screen-printing process, a direct growth, a chemical vapor deposition, and/or a sputtering process.

Considering the diffusing property of electron beams, in one embodiment, the electron emission regions 28 are not formed at edges but at a central portion of each crossed regions.

Each crossed region of the first and second electrodes 22 and 26 may correspond to one pixel region of the light emission device 10. Alternatively, two or more crossed regions of the first and second electrodes 22 and 26 may correspond to one pixel region of the light emission device 10. In this case, two or more first electrodes 22 and/or two or more second electrodes 26 that are placed in one pixel region are electrically connected to each other to receive a common drive voltage.

The light emission unit 20 includes a phosphor layer 30 and an anode electrode 32 formed on the phosphor layer 30. The phosphor layer 30 may be a white phosphor layer or a combination of red, green and blue phosphor layers. The white phosphor layer may be formed on the entire effective region of the second substrate 14 or patterned to have a plurality of sections corresponding to the respective pixel regions. In the present embodiment, a case where the white phosphor layer is formed on the entire effective region of the second substrate 14 is shown as an example, but the present invention is not thereby limited.

The anode electrode 32 may be formed of metal such as aluminum (Al) while covering the phosphor layer 30. The anode electrode 32 is an acceleration electrode that receives a high voltage to maintain the phosphor layer 30 at a high electric potential state. The anode electrode 32 can also function to enhance the luminance by reflecting the visible light, which is emitted from the phosphor layer 30 to the first substrate 12, back toward the second substrate 14.

Disposed between the first and second substrates 12 and 14 are spacers 34 for uniformly maintaining a gap between the first and second substrates 12 and 14 to withstand a compression force applied to the vacuum envelope. The spacers 34 are positioned at an outline (or outer portion) of the crossed region of the first and second electrodes 22 and 26. For example, the spacers 34 are positioned between the second electrodes 26. The spacers 34 may be formed of glass and/or ceramic.

Referring to FIG. 2, the light emission device of the present embodiment may further include a ground electrode (or electrodes) 36 spaced apart from the first and second electrodes 22 and 26 in the vacuum envelope. The ground electrode(s) 36 are connected to the sub-electrode(s) 221, 261 separated from the connecting portion 222, 262 so as to prevent the separated sub-electrode(s) from floating and thus excessively emitting light.

The ground electrode(s) 36 may be formed on an outer edge portion of the vacuum envelope so as to prevent a short circuit (or reduce a short circuit possibility) with the driving electrodes.

The above-described light emission device 10 is driven by applying drive voltages (that may be predetermined) to the first and second electrodes 22 and 26 and applying thousands volts of a positive DC voltage to the anode electrode 32. As such, an electric field is formed around the electron emission regions 28 at pixel regions where a voltage difference between the first and second electrodes 22 and 26 is higher than a threshold value, thereby emitting electrons from the electron emission regions 28. The emitted electrons are accelerated by the high voltage applied to the anode electrode 32 to collide with the corresponding phosphor layer 30, thereby exciting the phosphor layer 30. A light emission intensity of the phosphor layer 30 at each pixel corresponds to an electron emission amount of the corresponding pixel.

In this embodiment, the gap between the first and second substrates 12 and 14 may be in the range of, for example, from 5 to 20 mm and is greater than that of a conventional field emission type backlight unit. The anode electrode 32 receives a high voltage that is above 10 kV, and, in one embodiment, from about 10 to 15 kV. Accordingly, the light emission device 10 can realize a luminance that is above 10,000 cd/m2 at a central portion of the effective region.

During the above-described driving process, when there is a short circuit between the anode electrode 32 and the first electrode 22 and/or between the anode electrode 32 and the second electrode 26, only the sub-electrode 221, 261 where the short circuit is generated is separated from the electrode 22, 26. Therefore, the entire electrode 22, 26 is not short-circuited.

Figure 3:
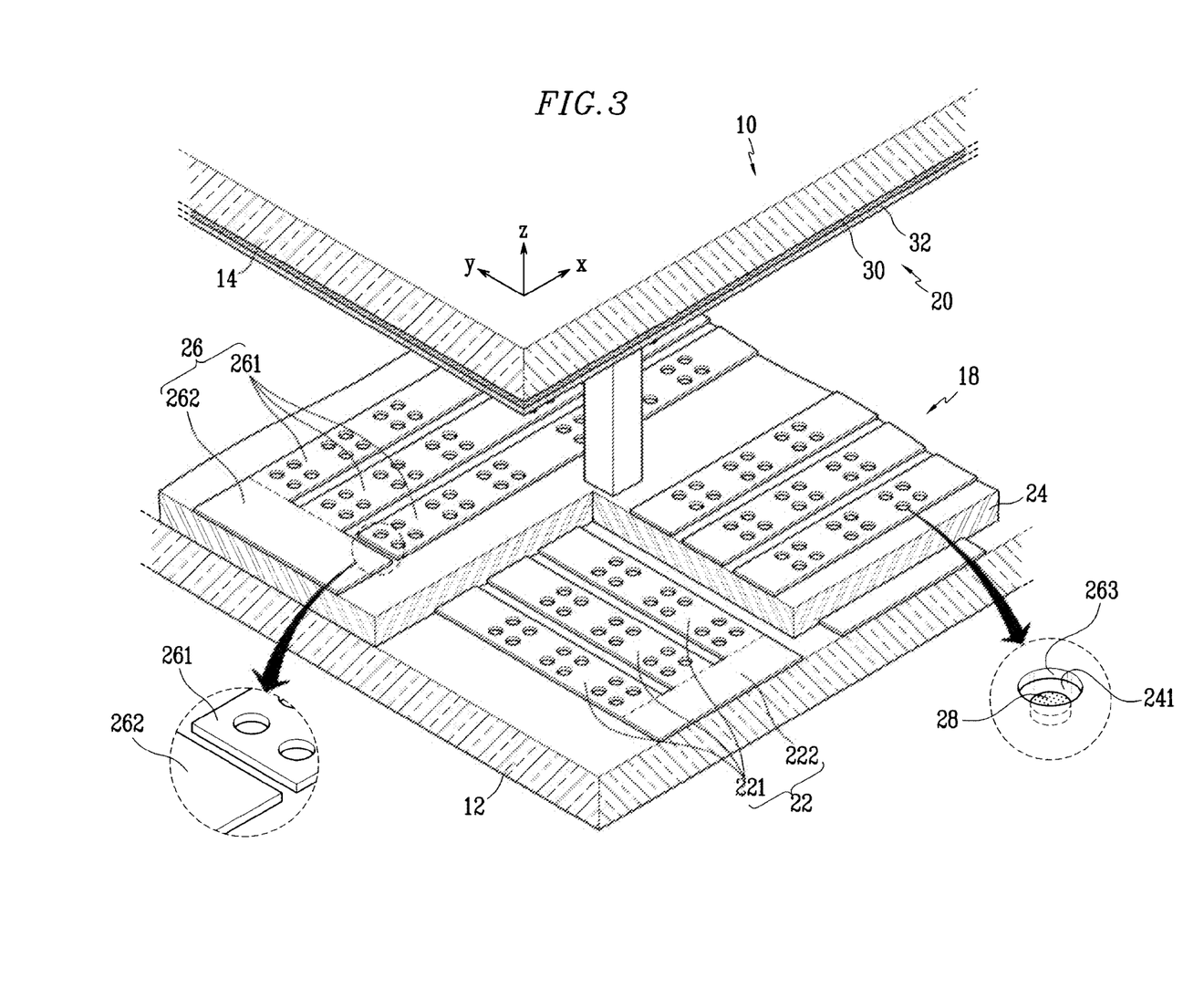
FIG. 3 is a partial perspective view of the light emission device of FIG. 1, illustrating a separated sub-electrode.
Figure 4:
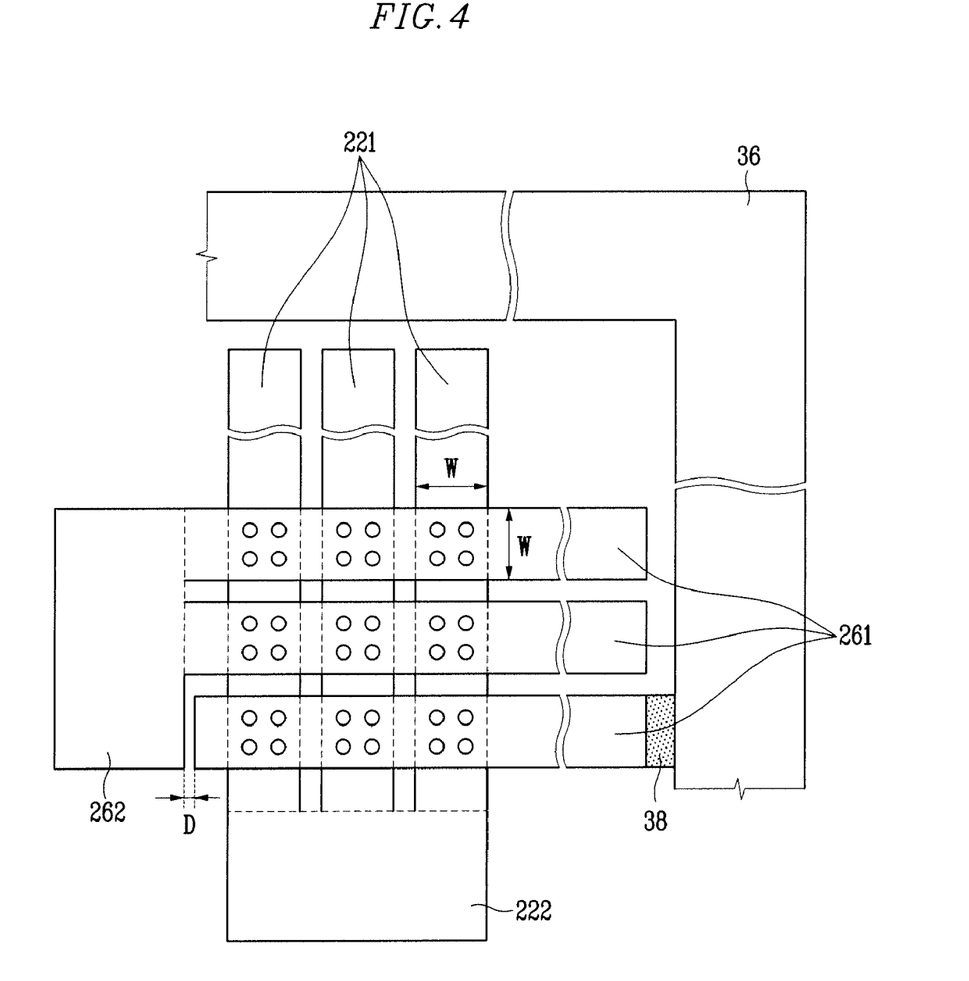
FIG. 4 is a partial top view of the light emission device of FIG. 3, illustrating the separated sub-electrode connected to a ground electrode.

FIGS. 3 and 4 show an example in which one (or more) of the second sub-electrodes 261 is(are) separated from the connecting portion 262 by a distance D (that may be predetermined) and connected to the ground electrode 36. Here, the separated second sub-electrode(s) 261 may be electrically connected to the ground electrode 36 by a conductive paste 38.

FIGS. 5A through 5G illustrate consecutive processes for manufacturing a light emission device according to an exemplary embodiment of the present invention.

Figure 5A:
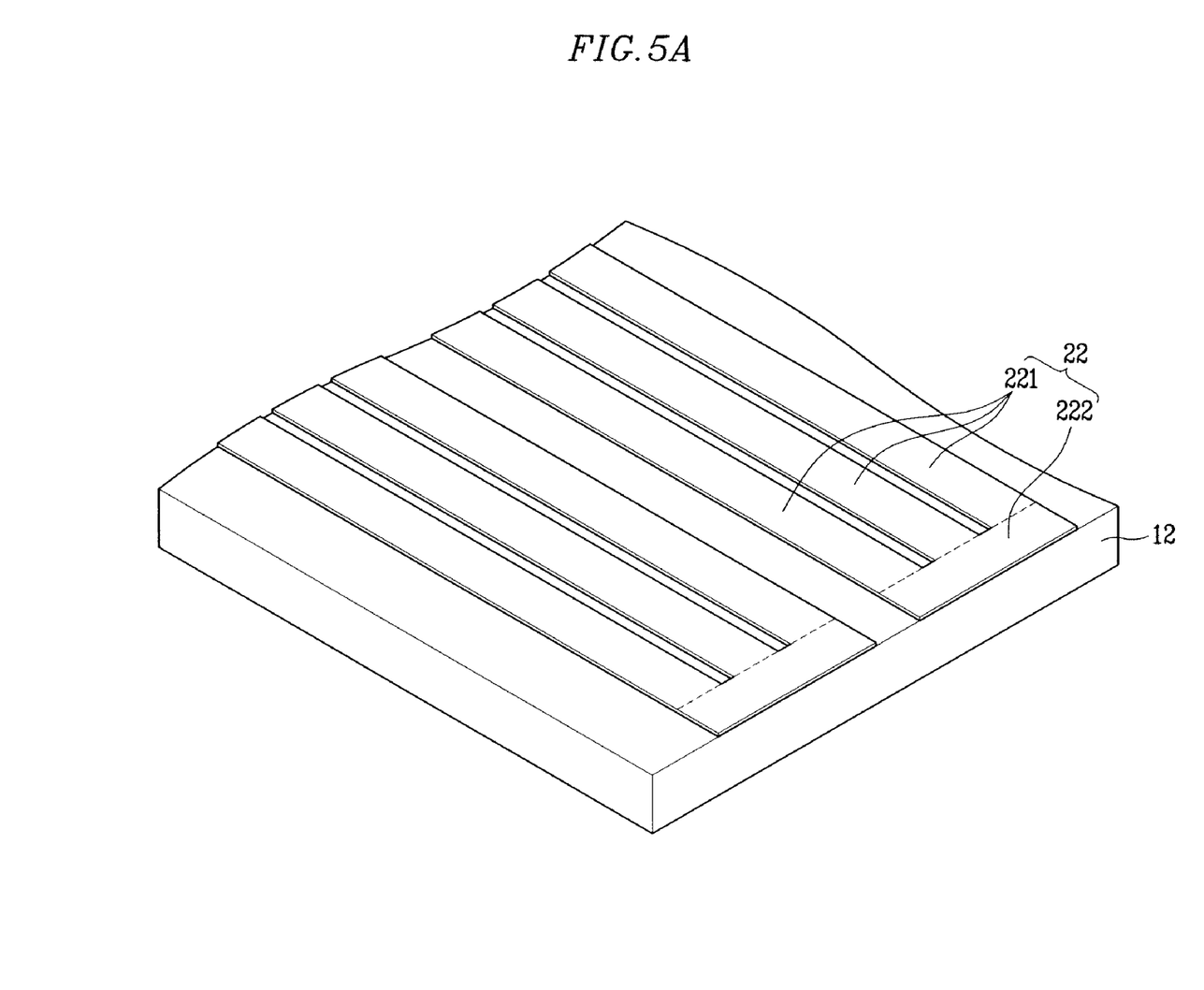
FIGS. 5A, 5B, 5C, 5D, 5E, and 5G are partial perspective views illustrating consecutive processes for manufacturing a light emission device according to an exemplary embodiment of the present invention.

Referring to FIG. 5A, the first electrodes 22 are formed on the first substrate 12 by forming a conductive layer formed of metal such as chromium (Cr) on the first substrate 12 and processing the conductive layer in a stripe pattern. Here, each of the first electrodes 22 includes the plurality of the divided sub-electrodes 221 and the first connecting portion 222 for electrically connecting the first ends of the first sub-electrodes 221.

Figure 5B:
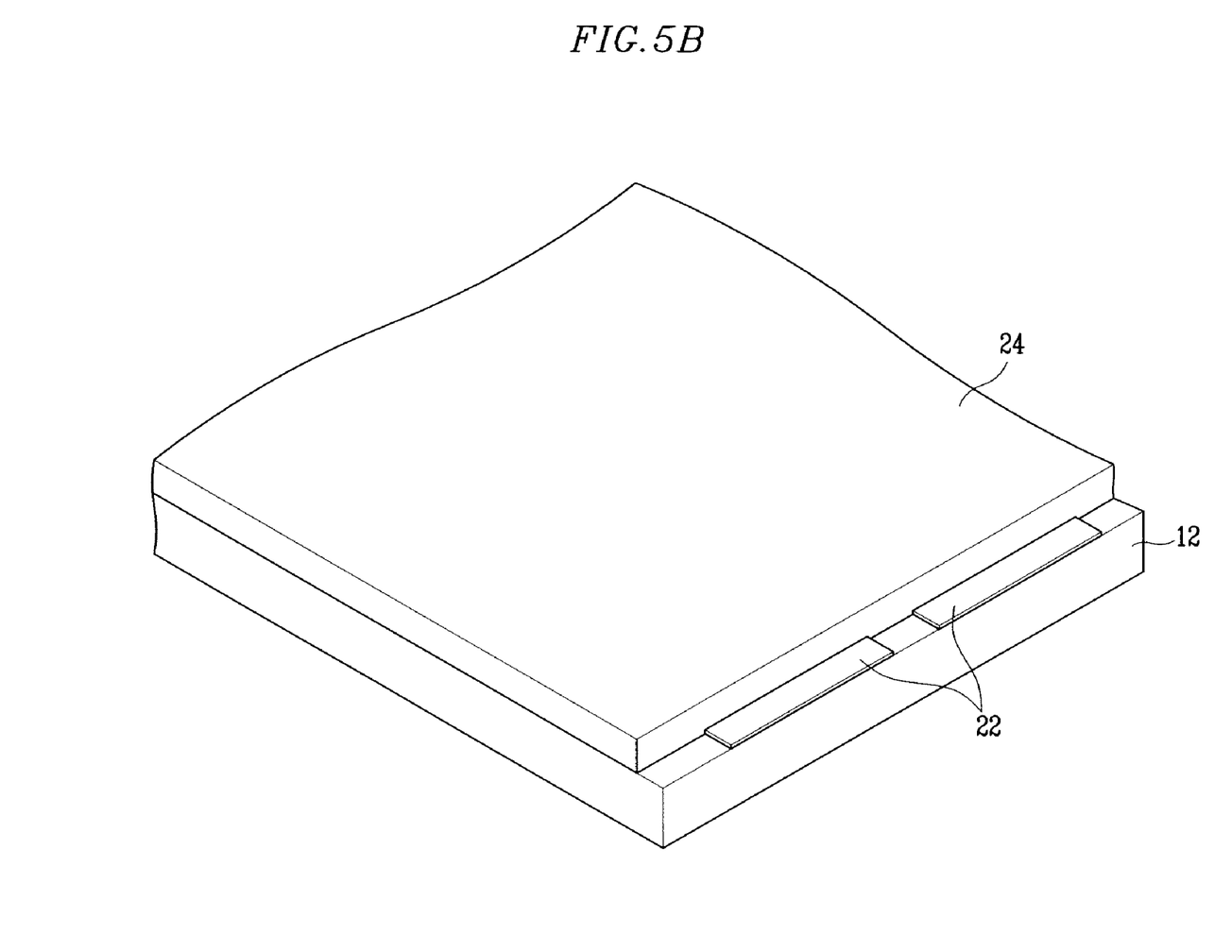

Referring to FIG. 5B, the insulation layer 24 having a thickness that may be predetermined is formed on the substrate 12 to cover the first electrodes 22 by depositing an insulation material on an entire surface of the first substrate 12. The insulation layer 24 may be formed by repeating a screen-printing process, a drying process, and/or a firing process more than one time. The thickness of the insulation layer 24 may be within a range from 3 to 5 µm.

Figure 5C:
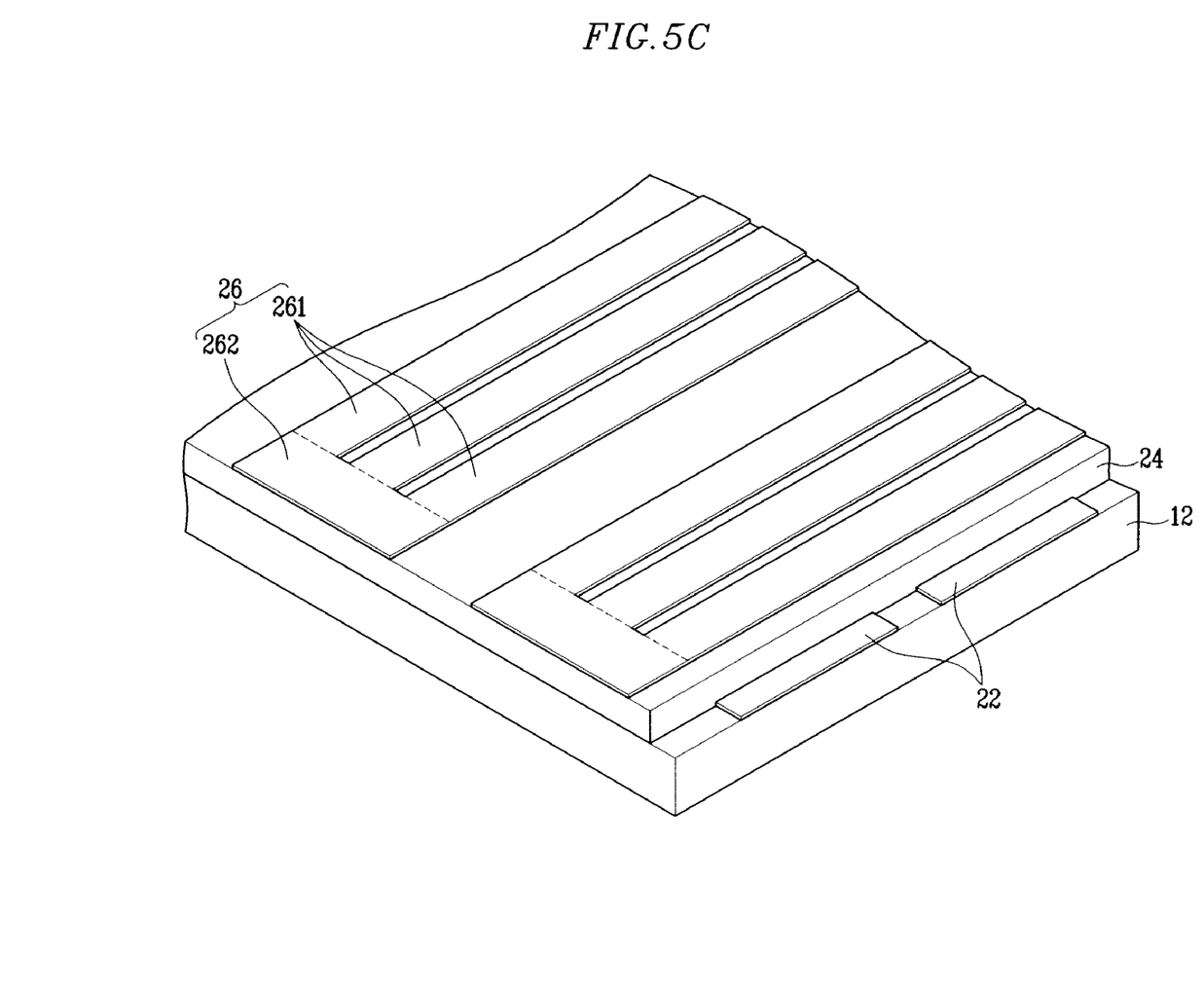

Referring to FIG. 5C, the second electrodes 26 are formed on the insulation layer 24 by forming a conductive layer on the insulation layer 24 and processing the conductive layer in a stripe pattern crossing the first electrodes 22 at right angles (or substantially right angles). Here, each of the second electrodes 26 includes the plurality of the divided sub-electrodes 261 and the second connecting portion 262 connecting the first ends of the second sub-electrodes 261.

Figure 5D:
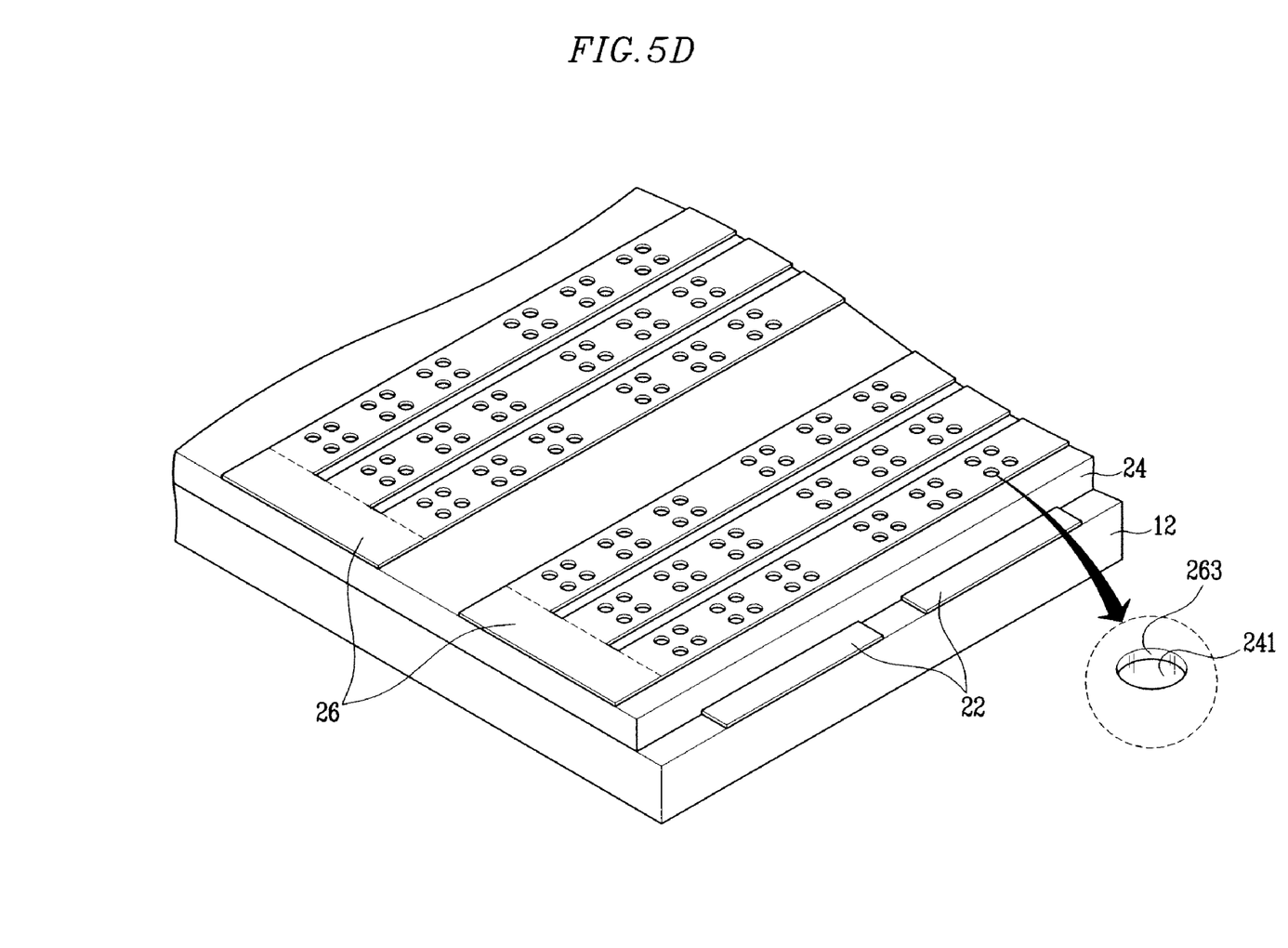

Referring to FIG. 5D, a mask layer having openings is formed on an entire surface of the first substrate 12 to cover the second electrodes 26 and then portion(s) of the second electrodes 26 exposed by the openings of the mask layer are etched using a second electrode etching solution to form the openings 263 in the second electrodes 26. Then, portion(s) of the insulation layer 24 exposed by the openings 263 of the second electrodes 26 are etched using an insulation layer etching solution to form the openings 241 in the insulation layer 24. Here, although the openings 241 and 263 are described to be formed through a wet-etching process, the present invention is not limited thereto. For example, the openings 241 and 263 may be formed through a drying etching process.

Figure 5E:
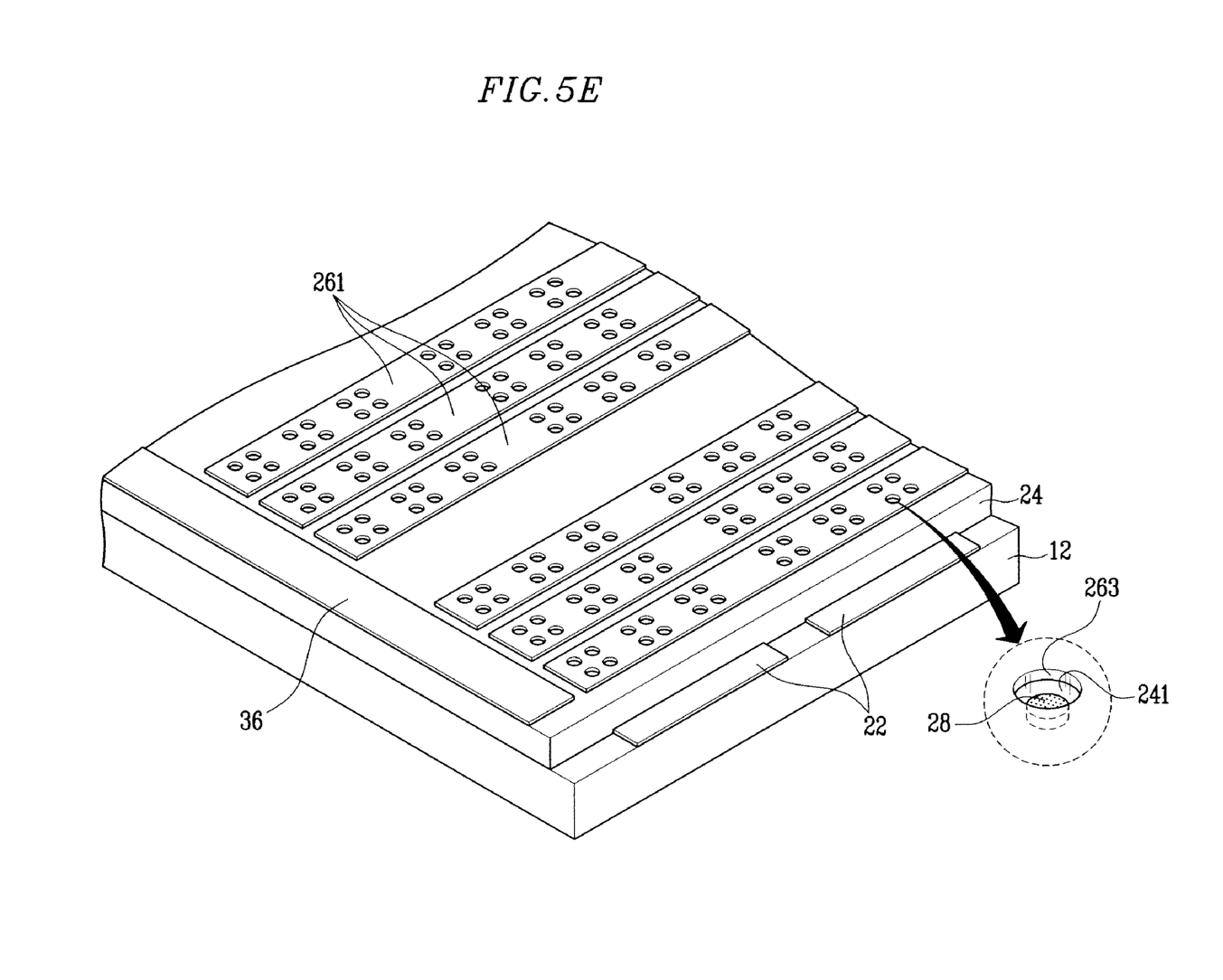

Referring to FIG. 5E, the ground electrode 36 is formed on the first substrate 12 by forming a conductive layer on the first substrate 12 and processing the conductive layer in a pattern that may be predetermined. The ground electrode 36 is formed near and spaced apart from second ends of the first and second sub-electrodes 221 and 261 by a distance that may be predetermined. Then, the electron emission regions 28 are formed on the exposed portion(s) of the first electrode 22 in the openings 241 of the insulation layer 24.

The electron emission regions 28 may be formed of a material including a carbon-based material and/or a nanometer-sized material. That is, the electron emission regions 28 are formed by preparing a mixture of the electron emission material (vehicle(s) and binder(s)); then screen-printing the mixture on the first substrate 12; and then drying and firing the printed mixture. Alternatively, the electron emission regions 28 may be formed through a direct-growth process, a chemical vapor deposition process, and/or a sputtering process.

Figure 5F:
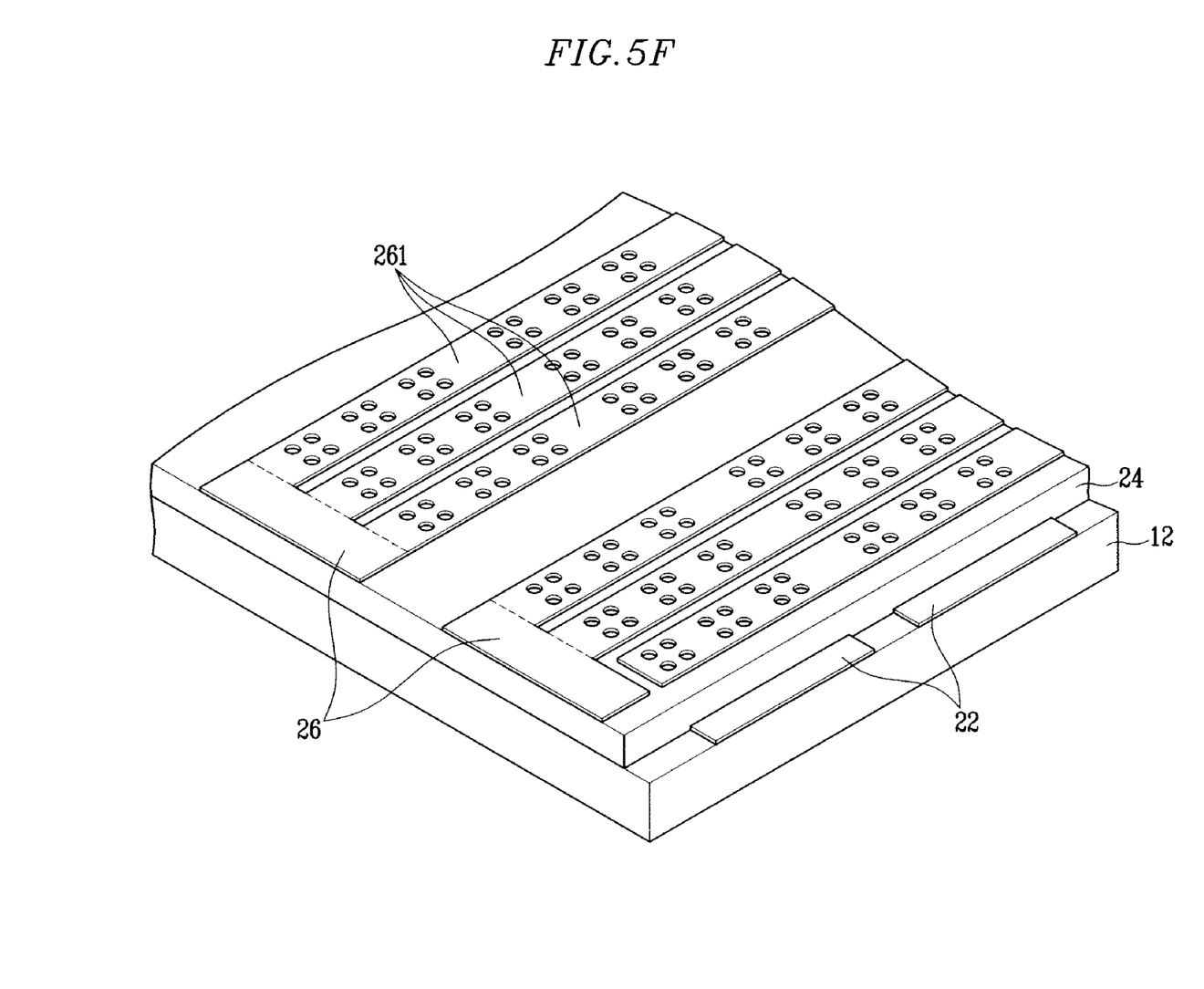

Referring to FIG. 5F, the first and second electrodes 22 and 26 are inspected by applying the driving voltage to the first and second electrodes 22 and 26 to detect a defective sub-electrode(s) 221, 261. Then, the defective sub-electrode (or electrodes) 221, 261 is separated from the connecting portion 222, 262. The separation of the defective sub-electrode(s) can be performed using an over-current.

Figure 5G:
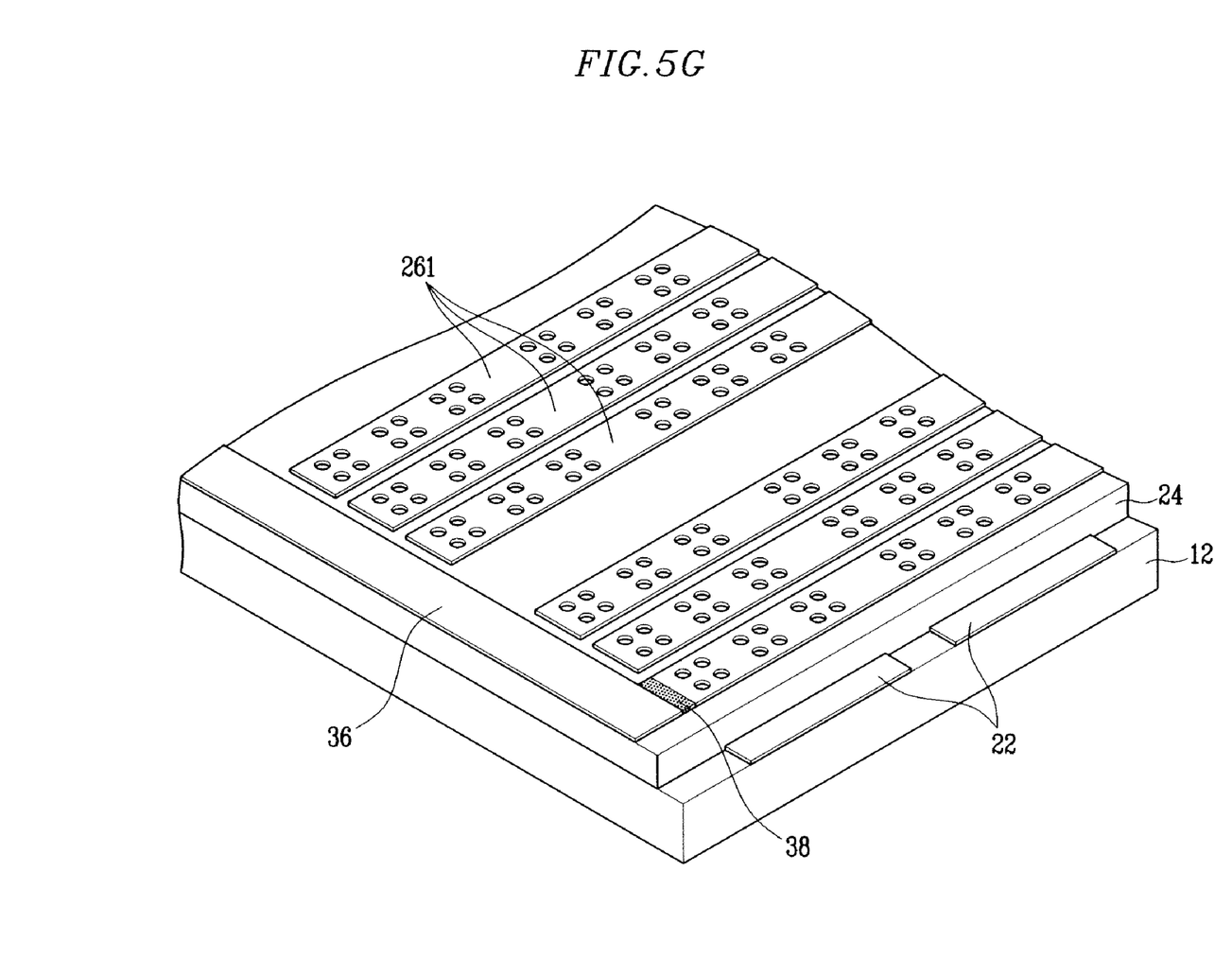

Referring to FIG. 5G, the defective sub-electrode 221, 261 separated from the connecting portion 222, 262 is connected to the ground electrode 36 so that the defective sub-electrode 221, 261 does not function as the driving electrode.

Figure 6:
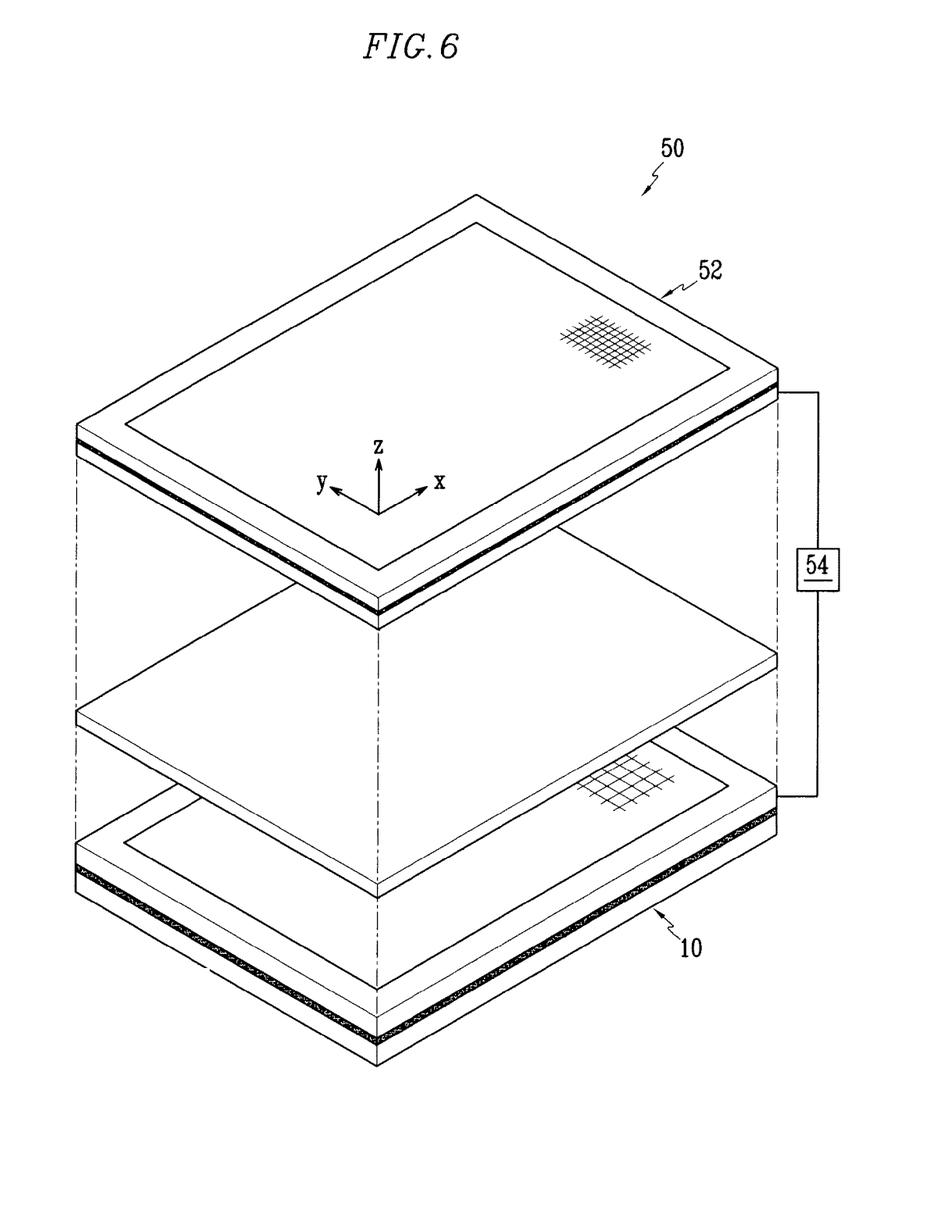
FIG. 6 is a partial exploded perspective view of a display device according to an exemplary embodiment of the present invention.

FIG. 6 is an exploded perspective view of a display device according to an embodiment of the present invention.

Referring to FIG. 6, a display device 50 includes a liquid crystal panel assembly 52 having a plurality of pixels arranged in rows and columns and the light emission device 10 (hereinafter also referred to as "backlight unit 10") for emitting light toward the liquid crystal panel assembly 52.

Any suitable conventional liquid crystal panel assemblies can be used as the liquid crystal panel assembly 52. If required, an optical member such as a diffuser plate may be interposed between the liquid crystal panel assembly 52 and the backlight unit 10.

In this embodiment, the number of pixels of the backlight unit 10 is less than that of the liquid crystal panel assembly 52 so that one pixel of the backlight unit 10 corresponds to two or more pixels of the liquid crystal panel assembly 52. Each pixel of the backlight unit 10 emits light in response to the highest gray value among the corresponding pixels of the liquid crystal panel assembly 52. The backlight unit 10 can represent a gray level (or gray value) ranging from 2 to 8 bits at each pixel.

For convenience purposes, the pixels of the liquid crystal panel assembly 52 are referred to as first pixels and the pixels of the backlight unit 10 are referred to as second pixels. In addition, a plurality of first pixels corresponding to one second pixel are referred to as a first pixel group.

In order to drive the backlight unit, a signal control unit 54 for controlling the liquid crystal panel assembly 52 detects a highest gray level (or value) among the first pixels of the first pixel group, calculates a gray value required for the light emission of the second pixel according to the detected gray value, converts the calculated gray value into digital data, and generates a driving signal of the backlight unit 10 using the digital data. Therefore, when an image is displayed by the first pixel group, the corresponding second pixel of the backlight unit 10 is synchronized with the first pixel group to emit the light with a gray level (or value) that may be predetermined.

The rows are defined in a horizontal direction (the x-axis in FIG. 6) of the screen formed by the liquid crystal panel assembly 52 and the columns are defined in a vertical direction (the y-axis in FIG. 6) of the screen formed by the liquid crystal panel assembly 52.

The number of pixels arranged in each row of the liquid crystal panel assembly 52 may be more than 240 and the number of pixels arranged in each line of the liquid crystal panel assembly 52 may also be more than 240. In addition, the number of pixels arranged in each row of the backlight unit 10 may be from 2 to 99 and the number of pixels arranged in each line of the backlight unit 10 may also be from 2 to 99. In one embodiment, when the number of the pixels in each of the row and column of the backlight unit 10 is higher than 99, it may be too complicated to drive the backlight, and the cost for manufacturing the driving circuit may increase.

As described above, the backlight unit 10 is an emissive display panel having from 2×2 to 99×99 resolutions. In addition, the light emission intensities of the pixels of the backlight unit 10 are independently controlled to emit a proper intensity of the light to each second pixel group of the liquid crystal panel assembly 52. As a result, the display device 50 of the present invention can enhance the dynamic contrast of the screen, thereby improving the display quality.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A light emission device comprising:
a first substrate and a second substrate facing each other to form a vacuum chamber;
a first electrode arranged on the first substrate in a first direction;
a second electrode arranged above the first electrode in a second direction crossing the first direction;
an insulation layer interposed between the first electrode and the second electrode;
an electron emission region electrically connected to one of the first electrode or the second electrode;
a phosphor layer arranged on the second substrate;
an anode electrode arranged on the phosphor layer; and
a ground electrode in the vacuum chamber,
wherein at least one of the first electrode or the second electrode is divided into a plurality of sub-electrodes,
wherein a driving error sub-electrode of the plurality of sub-electrodes is electrically separated from normally driving sub-electrodes of the plurality of sub-electrodes, and wherein the driving error sub-electrode of the plurality of sub-electrodes is electrically connected to the ground electrode.

2. The light emission device of claim 1, wherein a crossed region of the first electrode and the second electrode defines a unit pixel.

3. The light emission device of claim 1, wherein the driving error sub-electrode is physically separated from the normally driving sub-electrodes.

4. The light emission device of claim 1, wherein each of the plurality of sub-electrodes has a width ranging from about 0.1 to about 5 mm.

5. The light emission device of claim 1, wherein the first electrodes are divided into a plurality of sub-electrodes and the second electrodes are divided into a plurality of sub-electrodes, and wherein the plurality of sub-electrodes of the first electrode are equal in number to that of the plurality of sub-electrodes of the second electrode.

6. The light emission device of claim 1, wherein the electron emission regions are formed of a carbon-based material, a nanometer-sized material, or combinations thereof.

7. The light emission device of claim 1, wherein the driving error sub-electrode is a short circuited or damaged sub-electrode.

8. A display device comprising:
a light emission device; and
a panel assembly configured with the light emission device to display an image by receiving light emitted from the light emission device,
wherein the light emission device comprises:
a first substrate and a second substrate facing each other to form a vacuum chamber;
a first electrode arranged on the first substrate in a first direction;
a second electrode arranged in a second direction crossing the first direction with an insulation layer interposed between the first electrode and the second electrode;
an electron emission region electrically connected to one of the first electrode or the second electrode;
a phosphor layer arranged on the second substrate;
an anode electrode arranged on the phosphor layer; and
a ground electrode in the vacuum chamber,
wherein at least one of the first electrode or the second electrode is divided into a plurality of sub-electrodes,
wherein a driving error sub-electrode of the plurality of sub-electrodes is electrically separated from normally driving sub-electrodes of the plurality of sub-electrodes, and wherein the driving error sub-electrode of the plurality of sub-electrodes is electrically connected to the ground electrode.

9. The display device of claim 8, wherein the panel assembly includes a plurality of first pixels, and
wherein the light emission device includes a plurality of second pixels,
wherein the second pixels are less in number than that of the first pixels, and
wherein the second pixels allow for emitting different intensities of light at the second pixels.

10. The display device of claim 9, wherein the number of first pixels arranged in each row of the panel assembly is more than 240 and the number of first pixels arranged in each column of the panel assembly is more than 240.

11. The display device of claim 10, wherein the number of second pixels arranged in each row of the light emission device is within a range from 2 to 99 and the number of second pixels arranged in each column of the light emission device is within a range from 2 to 99.

12. The display device of claim 8, wherein a crossed region of the first electrode and the second electrode defines a unit pixel.

13. The display device of claim 12, wherein the driving error sub-electrode is physically separated from the normally driving sub-electrodes.

14. The display device of claim 8, wherein each of the plurality of sub-electrodes has a width ranging from about 0.1 to about 5 mm.

15. The display device of claim 8, wherein the first electrodes are divided into a plurality of sub-electrodes and the second electrodes are divided into a plurality of sub-electrodes, and wherein the plurality of sub-electrodes of the first electrode are equal in number to that of the plurality of sub-electrodes of the second electrode.

16. The display device of claim 8, wherein the electron emission regions are formed of a carbon-based material, a nanometer-sized material, or combinations thereof.

17. The display device of claim 8, wherein the driving error sub-electrode is a short circuited or damaged sub-electrode.

* * * * *